C. L. HOPKINS.
SPRING SHADE ROLLER.
APPLICATION FILED APR. 26, 1911.
1,068,054.
Patented July 22, 1913.
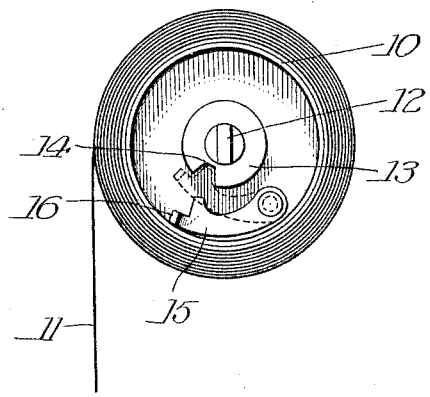
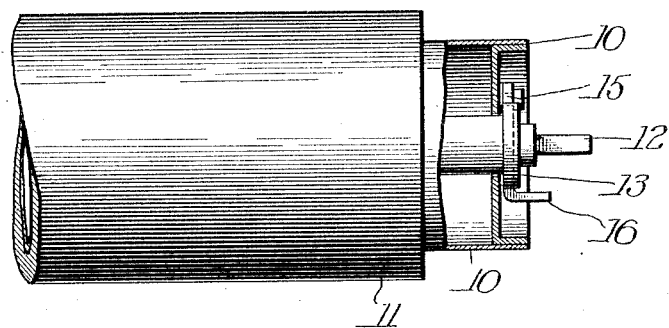
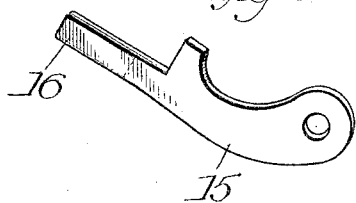
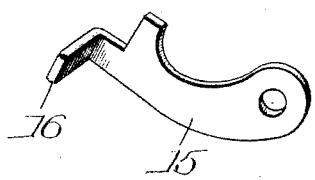
Witnesses:
Harold G. Barrett
Chas. T. Murray
Inventor:
Charles L. Hopkins.
by Linthicum, Belt & Fuller.
Attys.

UNITED STATES PATENT OFFICE.

CHARLES L. HOPKINS, OF CHICAGO, ILLINOIS, ASSIGNOR TO THE CURTAIN SUPPLY COMPANY, OF NEWARK, NEW JERSEY, A CORPORATION OF NEW JERSEY.

SPRING SHADE-ROLLER.

1,068,054.     Specification of Letters Patent.     Patented July 22, 1913.

Application filed April 26, 1911. Serial No. 623,485.

*To all whom it may concern:*

Be it known that I, CHARLES L. HOPKINS, a citizen of the United States, residing at Chicago, in the county of Cook and State of Illinois, have invented certain new and useful Improvements in Spring Shade-Rollers, of which the following is a specification.

This invention relates to an improvement in spring shade-rollers, of that class wherein the spindle is provided with a notched hub, and the revolving barrel upon which the shade winds carries a dog adapted to engage the notch in the hub, whereby the shade is caused to be stationary at certain points.

In certain cases, where it is desirable that the roller exert a constant tendency to wind up the shade, as in street and railway cars, it is customary to employ a roller wherein the hub is provided with a single notch, and to place the roller in its brackets with the notched side of the hub down, so that the dog will tend to fall away from the hub instead of toward it and into the notch. In such a case the purpose of the dog and notch is merely to prevent unwinding of the spring while the roller is out of the brackets. After the roller is placed in the brackets the dog and notch are useless until it is desired to remove the roller from the brackets.

To effect the removal of the shade and roller from the brackets, the dog must first be lifted into the notch. Rollers as heretofore constructed have commonly been provided with a small hole into which a pin or piece of wire of small diameter may be inserted and pushed up against the dog to lift it into the notch. This, in some cases, is not easily accomplished. In the construction of cars the spaces provided for the curtain rollers are often small and difficult of access. Furthermore, it is not possible to see the mechanism on the end of the roller when the roller is in position.

In view of the objections and difficulties just enumerated, it is the object of the present invention to facilitate the manual manipulation of the dog to engage and disengage the same with respect to the notch in the spindle, and furthermore to provide for effectually indicating the position of the dog with respect to the notch, so that it can readily be determined when the dog is in a position to be engaged with the notch.

In the drawings Figure 1 is an end view of the roller, with a curtain partly wound thereon, the dog being shown in the normal position, or out of the notch, in full lines, and in the notch in dotted lines; Fig. 2 is a top plan of the same, showing the extreme end of the roller in section; Fig. 3 is a perspective view of the blank for the dog stamped from sheet metal, and Fig. 4 is a perspective view of the dog after being bent into final form.

In these drawings 10 is the barrel of the roller, upon which winds the curtain 11. The interior mechanism of the roller is well known and, forming no part of the present invention, will not be described or shown.

12 is the spindle, with its hub 13, provided with the notch 14.

The dog 15 is pivoted to the end or head of the barrel 10 and revolves with it. In service the roller will be in the position shown, that is, with the hub-notch down, so that the dog will not enter the notch.

When it is desired to remove the curtain and roller from the brackets the dog will first be raised into the notch. This will prevent the roller from rotating and the latter may then be lifted out of the brackets. To facilitate the lifting of the dog it is formed with the extension 16 which projects out from the end of the roller a sufficient distance to make it easily accessible. It is only necessary to put a finger up to the end of the roller, when the projection of the dog may be found and the dog lifted into the notch.

In addition to forming a handle or finger piece for convenience in manipulating the dog 15, the part 16 constitutes a visible index, in that the part 16 projects beyond the cylindrical flange on the end of the roller and is therefore visible. As the notch 14 is in the underside of the spindle, the curtain can be manipulated so as to rotate the roller until it is noticed that the part 16 is below the spindle, which will indicate that the dog is in position to be engaged with the notch, whereupon the dog may be conveniently lifted into engagement with the notch by pressing upwardly upon the part 16. It is therefore apparent that the part 16 has a two-fold function, viz., a handle or finger piece and a visible index.

The dog may be cut from a piece of sheet metal in the usual way, and the end 16 bent up. Fig. 3 shows the blank as stamped out, and Fig. 4 the dog after the end 16 has been bent up.

I claim as my invention and desire to secure by Letters Patent:

A shade roller provided at one end with a cylindrical flange, a spring-tensioned spindle mounted in the roller and projecting at the flanged end thereof, said spindle having a notch disposed within the flange of the roller and normally lying at the lower side of the spindle when the roller is in use, and a dog pivoted to the roller and lying within the cylindrical flange, said dog being adapted to engage the notch and interlock the roller and spindle, and also provided with a lateral projection extending outwardly beyond the flange and forming a handle for manipulating the dog and also constituting a visible index to indicate the position of the dog with respect to the notch.

CHARLES L. HOPKINS.

Witnesses:
E. E. COTTLE,
CHAS. F. MURRAY.

Copies of this patent may be obtained for five cents each, by addressing the "Commissioner of Patents, Washington, D. C."